United States Patent [19]

Hayashi et al.

[11] Patent Number: 5,264,499

[45] Date of Patent: Nov. 23, 1993

[54] ORGANOPOLYSILOXANE COMPOSITION FOR THE FORMATION OF A CURED RELEASE FILM

[75] Inventors: Masushi Hayashi, Saitama; Nobuo Kaiya; Shosaku Sasaki, both of Chiba, all of Japan

[73] Assignee: Dow Corning Toray Silicone Co. Ltd., Tokyo, Japan

[21] Appl. No.: 992,375

[22] Filed: Dec. 17, 1992

[30] Foreign Application Priority Data

Dec. 20, 1991 [JP] Japan ................... 3-356079

[51] Int. Cl.$^5$ ............................. C08L 83/07
[52] U.S. Cl. ................... 525/478; 524/267; 524/730; 524/731; 528/15
[58] Field of Search ............ 528/15; 525/478; 524/267, 730, 731

[56] References Cited

U.S. PATENT DOCUMENTS 5,064,916 11/1991 Sasaki et al. ............... 525/478

FOREIGN PATENT DOCUMENTS 0400614 5/1990 European Pat. Off. .
371405A3 6/1990 European Pat. Off. .

*Primary Examiner*—Melvyn I. Marquis
*Attorney, Agent, or Firm*—Sharon K. Severance

[57] ABSTRACT

The instant invention pertains to an organopolysiloxane composition for the formation of a release film, that has a high curing rate at relatively low temperatures ($\leq 100°$ C.) and that forms a cured film that both adheres strongly to various types of substrates and is highly releasing for tacky or sticky substances. The organopolysiloxane composition for the formation of a cured release film of the instant invention comprises (A) organopolysiloxane that contains in each molecule at least 2 alkenyl groups with the general formula $H_2C=CH-(CH_2)_n-$, wherein n=2 to 8; (B) an organohydrogenpolysiloxane that contains in each molecule at least 2 silicon-bonded hydrogen atoms and at least 1 alkenyl group with the general formula $H_2C=CH-(CH_2)_n-$, wherein n=2 to 8; (C) an addition-reaction inhibitor; (D) platinum group metal catalyst; and optionally (E) a nonreactive organopolysiloxane that contains neither silicon-bonded alkenyl nor silicon-bonded hydrogen.

10 Claims, No Drawings

ORGANOPOLYSILOXANE COMPOSITION FOR THE FORMATION OF A CURED RELEASE FILM

BACKGROUND OF THE INVENTION

Organopolysiloxane compositions for the formation of a cured release film based on higher alkenyl-containing (typically hexenyl-containing) organopolysiloxanes are known in the art. These compositions cure rapidly at relatively low temperatures ($\leq 100°$ C.) to form cured films that exhibit an excellent release performance against tacky or sticky substances. As a consequence, these compositions have been used as cured release film forming organopolysiloxane compositions for release paper, transfer paper, and so forth. For example, see U.S. Pat. No. 5,064,916 and European Patent Application No. 371405. However, these compositions are poorly adhesive to a variety of substrates, such as paper, synthetic films, polyethylene-laminated kraft paper, and others. As a result, the cured films produced by these compositions are easily exfoliated or delaminated from the substrate or base and are therefore are not useful in some applications.

The object of the instant invention is a cured release film forming organopolysiloxane composition that cures rapidly at relatively low temperatures ($\leq 100°$ C.) to form a cured film that is strongly adhesive to a variety of substrates and that also exhibits a superior release performance against tacky or sticky materials.

SUMMARY OF THE INVENTION

The present invention relates to an organopolysiloxane composition for the formation of a cured release film (hereinafter also referred to as a cured release film forming organopoly- siloxane composition) that is comprised of (A) 100 weight parts organopolysiloxane that contains in each molecule at least 2 alkenyl groups with the general formula $$H_2C=CH-(CH_2)_n-$$

wherein n has a value of 2 to 8;
(B) 1 to 200 weight parts organohydrogenpolysiloxane that contains in each molecule at least 2 silicon-bonded hydrogen atoms and at least 1 alkenyl group with the general formula $$H_2C=CH-(CH_2)_n-$$

wherein n has a value of 2 to 8,
(C) an addition-reaction inhibitor,
(D) a catalytic quantity of a platinum group metal catalyst, and optionally
(E) up to 200 weight parts of a nonreactive organopolysiloxane that contains neither silicon-bonded alkenyl nor silicon-bonded hydrogen,

THE INVENTION

The present invention relates to an organopolysiloxane composition for the formation of a cured release film (hereinafter also referred to as a cured release film forming organopolysiloxane composition). The cured release film forming organopolysiloxane composition of the instant invention is comprised of (A) an organopolysiloxane that contains in each molecule at least 2 alkenyl groups with the general formula $$H_2C=CH-(CH_2)_n-$$

where in n has a value of 2 to 8;
(B) an organohydrogenpolysiloxane that contains in each molecule at least 2 silicon-bonded hydrogen atoms and at least 1 alkenyl group with the general formula $$H_2C=CH-(CH_2)_n-$$

wherein n has a value of 2 to 8,
(C) addition-reaction inhibitor,
(D) a platinum group metal catalyst and optionally
(E) a nonreactive organopolysiloxane that contains neither silicon-bonded alkenyl nor silicon-bonded hydrogen.

Component (A) of the instant invention is an organopolysiloxane that contains in each molecule at least 2 alkenyl groups with the general formula $$H_2C=CH-(CH_2)_n-$$

wherein n has a value of 2 to 8. Preferably n has a value of 3 to 8. When n is less than 2, the composition of the present invention suffers from a slow rate of cured film formation; on the other hand, alkenyl organopolysiloxanes having values of n in excess of 8 are difficult to synthesize. Further, no specific restriction applies to the degree of polymerization of the alkenyl organopolysiloxane, (A). Alkenyl organopolysiloxanes with low degrees of polymerization corresponding to 100 centipoise (at 25° C.) to the high degrees of polymerization of gums are useful in the instant invention.

The alkenyl organopolysiloxane (A) is exemplified by organopolysiloxanes with the following average unit formula $$R_bSiO_{(4-b)/2}$$

that contains in each molecule at least 2 alkenyl groups with the general formula $$H_2C=CH-(CH_2)_n-$$

wherein R is selected from a substituted or unsubstituted monovalent hydrocarbon group, b has a value of 1.9 to 2.05 and n has a value of 2 to 8. R may be further exemplified by, but not limited to, alkyl groups such as methyl, ethyl, propyl and butyl; alkenyl groups with general formula $H_2C=CH-(CH_2)_n-$ wherein n has a value of 2 to 8 such as hexenyl, heptenyl, butenyl, pentenyl, and others; aryl groups such as phenyl, tolyl, and xylyl; and substituted alkyl groups such as 2-phenylethyl, 2-phenylpropyl, and 3,3,3-trifluoropropyl. From the standpoint of the release performance, it is preferable that at least 70 mol % of R is the methyl group. The alkenyl organopolysiloxane (A) may also contain small quantities of silicon-bonded hydroxyl groups and alkoxy groups.

The alkenyl organopolysiloxane (A) may be exemplified by, but not limited to:
dimethylbutenylsiloxy-endblocked dimethylpolysiloxanes,
dimethylpentenylsiloxy-endblocked dimethylpolysiloxanes,
dimethylhexenylsiloxy-endblocked dimethylpolysiloxanes, dimethylheptenylsiloxy-endblocked dimethylpolysiloxanes,
dimethyloctenylsiloxy-endblocked dimethylpolysiloxanes,
trimethylsiloxy-endblocked butenylmethylsiloxane-dimethylsiloxane copolymers,
silanol-endblocked butenylmethylsiloxane-dimethylsiloxane copolymers,
trimethylsiloxy-endblocked methylpentenylsiloxane-dimethylsiloxane copolymers,
trimethylsiloxy-endblocked hexenylmethylsiloxane-dimethylsiloxane copolymers,
silanol-endblocked hexenylmethylsiloxane-dimethylsiloxane copolymers,
trimethylsiloxy-endblocked methylheptenylsiloxane-dimethylsiloxane copolymers,
trimethylsiloxy-endblocked methyloctenylsiloxane-dimethylsiloxane copolymers,
dimethylpentenylsiloxy-endblocked methylphenylsiloxane-dimethylsiloxane copolymers,
silanol-endblocked methylpentenylsiloxane-dimethylsiloxane copolymers,
dimethylhexenylsiloxy-endblocked hexenylmethylsiloxane-dimethylsiloxane copolymers, and
dimethylhexenylsiloxy-endblocked diphenylsiloxane-dimethylsiloxane copolymers.

The organohydrogenpolysiloxane component (B) used by the present invention is a crosslinker for component (A) and also functions to equip the composition of the present invention with adhesiveness for the surfaces of various types of substrates. Each molecule of the organohydrogenpolysiloxane must contain at least 2 silicon-bonded hydrogen atoms and at least 1 alkenyl group with the general formula

$H_2C=CH-(CH_2)_n-$ wherein n has a value of 2 to 8. The alkenyl groups in the organohydrogenpolysiloxane may be exemplified by, but not limited to hexenyl, heptenyl, butenyl, pentenyl, and others. The hexenyl group is the preferred alkenyl group. Moreover, each molecule preferably contains at least 4 alkenyl groups.

The organohydrogenpolysiloxane, (B), may be exemplified by, but not limited to: hexenyl-containing organohydrogenpolysiloxanes such as
trimethylsiloxy-endblocked hexenylmethylsiloxane-hydrogenmethylsiloxane copolymers,
trimethylsiloxy-endblocked hydrogenmethylsiloxane-hexenylhydrogensiloxane copolymers,
trimethylsiloxy-endblocked dimethylsiloxane-hexenylmethylsiloxane-hydrogenmethylsiloxane copolymers,
trimethylsiloxy-endblocked dimethylsiloxane-hexenylhydrogensiloxane copolymers, and others;
heptenyl-containing organohydrogenpolysiloxanes such as trimethylsiloxy-endblocked methylheptenylsiloxane-hydrogenmethylsiloxane copolymers,
trimethylsiloxy-endblocked dimethylsiloxane-heptenylmethylsiloxane-hydrogenmethyl siloxane copolymers,
trimethylsiloxy-endblocked dimethylsiloxane-heptenylhydrogensiloxane copolymers, and others.

Component (C), an addition-reaction inhibitor, employed in the present invention is necessary in order so that the composition is stable upon storage at room temperature. Component (C) may be exemplified by, but not limited to, alkyne alcohols such as 3-methyl-1-butyn-3-ol, 3,5-dimethyl-1-hexyn-3-ol, and phenylbutynol; ene-yne compounds such as 3-methyl-3-penten-1-yne and 3,5-dimethyl-3-hexen-1-yne; and tetramethyltetrahexenylcyclo- tetrasiloxane, benzotriazole, and others. Component (C) should be employed in a quantity that will afford a practical shelf stability (use time). Since the reaction-inhibiting effect varies with the molecular structure, the amount that must be used is not specifically restricted and must be selected as appropriate for the particular compound employed. However, the addition-reaction inhibitor is generally used at 0.001 to 5 weight parts per 100 weight parts component (A).

The platinum group metal catalyst, component (D), of the present invention is a catalyst capable of crosslinking and curing of components (A) and (B). Component (D) may be exemplified by, but not limited to, chloroplatinic acid, alcohol-modified chloroplatinic acid, the olefin complexes of chloroplatinic acid, chloroplatinic acid/vinylsiloxane complex compounds, microparticulate platinum adsorbed on a carbon powder carrier, platinum black, palladium catalysts, and rhodium catalysts. Component (D) should be used in a catalytic quantity. A catalytic quantity is a quantity sufficient to induce curing of the composition of the present invention. However, in order to bring about curing of the present composition in a short period of time at temperatures $\leq 100°$ C., this component should generally be used at 1 to 1,000 ppm as platinum metal per 100 weight parts component (A) and is more preferably used at 10 to 300 ppm as platinum metal per 100 weight parts component (A).

The nonreactive organopolysiloxane, component (E), employed in the present invention is used on an optional basis to bring about further improvements in the release performance. After the composition of the present invention has cured, this component is present free in the resulting cured product.

This organopolysiloxane (E) must not contain silicon-bonded alkenyl groups or silicon-bonded hydrogen atoms, and it is preferably a liquid or gum at room temperature.

The organopolysiloxane (E) may be exemplified by, but not limited to, trimethylsiloxy-endblocked dimethylpolysiloxanes, dimethylphenylsiloxy-endblocked dimethylpolysiloxanes, and trimethylsiloxy-endblocked dimethylsiloxane-methylphenylsiloxane copolymers. Among these, the trimethylsiloxy-endblocked dimethylpolysiloxanes are preferred. Component (E) is added at 0 to 200 weight parts per 100 weight parts component (A) and preferably at 1 to 150 weight parts per 100 weight parts component (A).

The cured release film forming organopolysiloxane composition of the present invention is prepared simply by mixing components (A), (B), (C), and (D) or components (A) through (E) to homogeneity.

When the cured release film forming organopolysiloxane composition of the present invention is to be coated on the surface of a sheet-form base (e.g., paper, synthetic film, polyethylene-laminated kraft paper, and others), it may be directly applied without modification or it may be used diluted with an organic solvent capable of dissolving it. Such organic solvents may be exemplified by, but not limited to, aromatic hydrocarbons such as toluene, xylene, and benzene; hydrocarbons such as heptane and hexane; and chlorinated hydrocarbons such as trichloroethane and perchloroethane.

So that those skilled in the art can understand and appreciate the invention taught herein, the following examples are presented, being it understood that these examples should not be used to limit the scope of this invention found in the claims attached hereto.

In the examples, parts designates weight parts, the viscosity is the value at 25° C., and cs is an abbreviation for centistokes. The curability and adhesiveness, peel resistance, and residual adhesiveness were measured by the following methods.

Curability and Adhesiveness

The organopolysiloxane release composition was first coated to a thickness of approximately 1 micrometer (as solids) on the surface of polyethylene-laminated kraft paper. This was subsequently heated at the specified temperature in a hot air-circulation dryer to produce the cured film. Dulling and delamination of the cured film were evaluated by firmly rubbing the surface of the cured film with a finger (10 complete back-and-forth motions).

Peel Resistance

The organopolysiloxane release composition was first coated to a thickness of approximately 1 micrometer (as solids) on the surface of polyethylene-laminated kraft paper. A cured film was then produced by heating for 30 seconds in a hot air-circulation dryer at 90° C. The surface of this cured film was coated with 25 g/m$^2$ (as solids) of a solvent-formulated rubber-based sensitive adhesive (Oribine BPS2411 from Toyo Ink chekc screen Ink Mfg. Company, Limited) followed by heating for 2 minutes at 100° C. A facing paper with a weight of 55 g/m$^2$ was applied to the treated surface afforded thereby, and a measurement specimen was then prepared by aging for 10 days at 25° C. under a 20 g/cm$^2$ load. The resulting measurement specimen was cut to a width of 5 cm to give the test specimen. Using a tensile tester, the force (g) required for tensile peeling of the facing paper from the test specimen was measured using a 180° peel and a tensile rate of 30 cm/minute.

Residual Adhesiveness

A cured film of the organopolysiloxane composition was formed on the surface of polyethylene-laminated paper by the same method as described for the peel resistance, and a polyester tape (Polyester Tape 31B, brandname of Nitto Denko Kabushiki Kaisha) was then applied to this surface. A load of 20 g/cm$^2$ was placed on this assembly followed by heating for 20 hours at 70° C. The tape was then peeled off and applied to a stainless steel plate using a 2 kg rubber roller. Again using a tensile tester, the tape was peeled and the adhesive force (g) was measured.

EXAMPLE 1

80 g trimethylsiloxy-endblocked methylhydrogenpolysiloxane with viscosity of 20 cs, 10 g silanol-endblocked hexenylmethylpolysiloxane with viscosity of 2 cs, 40 g octamethylcyclotetrasiloxane, and 3 g active clay were introduced into a condenser-equipped 600 mL flask. An equilibration reaction was then run for 5 hours at 80° C. while stirring under a nitrogen current. The obtained reaction product was filtered to obtain a dimethylsiloxane-hexenylmethylsiloxane-hydrogenmethylsiloxane copolymer with viscosity of 130 cs.

An organopolysiloxane composition for the formation of a cured release film was prepared by dissolving 5 parts of the dimethylsiloxane-hexenylmethylsiloxane-hydrogenmethylsiloxane copolymer prepared above and 0.3 weight parts 3,5-dimethyl-1-hexyn-3-ol in 100 weight parts hydroxyl-endblocked dimethylsiloxane-hexenylmethylsiloxane copolymer gum (hexenylmethylsiloxane unit content=3 mol %) into 700 weight parts toluene. A chloroplatinic acid/divinyltetramethyldisiloxane complex was dissolved in this solution to give 120 ppm as platinum based on the total organopolysiloxane weight. The curability, adhesiveness, peel resistance, and residual adhesiveness of this composition were measured, and these results are reported below in Tables 1 and 2.

EXAMPLE 2

120 g trimethylsiloxy-endblocked methylhydrogenpolysiloxane with viscosity of 20 cs, 130 g silanol-endblocked hexenylmethylpolysiloxane with viscosity of 2 cs, 10 g octamethylcyclotetrasiloxane, and 3 g active clay were introduced into a condenser-equipped 600 mL flask. An equilibration reaction was then run for 5 hours at 80° C. while stirring under a nitrogen current. The obtained reaction product was filtered to obtain a dimethylsiloxane-hexenylmethylsiloxane- hydrogenmethylsiloxane copolymer with viscosity of 180 cs.

An organopolysiloxane composition for the formation of a cured release film was prepared by dissolving 5 parts of the dimethylsiloxane-hexenylmethylsiloxane-hydrogenmethylsiloxane copolymer prepared above and 0.3 weight parts 3,5-dimethyl-1-hexyn-3-ol in 100 weight parts hydroxyl-endblocked dimethylsiloxane-hexenylmethylsiloxane copolymer gum (hexenylmethylsiloxane unit content=3 mol %) into 700 weight parts toluene. A chloroplatinic acid/divinyltetramethyldisiloxane complex was dissolved in this solution to give 120 ppm as platinum based on the total organopolysiloxane weight. The curability, adhesiveness, peel resistance, and residual adhesiveness of this composition were measured, and these results are reported below in Tables 1 and 2.

EXAMPLE 3

An organopolysiloxane composition for the formation of a cured release film was prepared by dissolving 5 parts of the dimethylsiloxane-hexenylmethylsiloxane-hydrogenmethylsiloxane copolymer prepared in Example 1 and 0.3 weight parts 3,5-dimcthyl- 1-hexyn-3-ol in 50 parts hydroxyl-endblocked dimethylsiloxane- hexenylmethylsiloxane copolymer gum (hexenylmethylsiloxane content=3 mol %) and 50 parts trimethylsiloxy-endblocked dimethylpolysiloxane gum into 700 parts toluene. A chloroplatinic acid/divinyltetramethyldisiloxane complex was dissolved in this solution to give 120 ppm as platinum based on the total organopolysiloxane weight. The properties of this composition were measured as in Example 1, and these results are reported below in Tables 1 and 2.

COMPARISON EXAMPLE 1

A cured release film forming organopolysiloxane composition was prepared as in Example 1, except that a trimethylsiloxy- endblocked methylhydrogenpolysiloxane with viscosity of 20 cs was used in place of the dimethylsiloxane-hexenylmethylsiloxane- hydrogenmethylsiloxane copolymer used in Example 1. The properties of this composition were measured as in Example 1, and these results are reported in Tables 1 and 2.

TABLE 1

| CURING CONDITIONS | | CURE STATE | | | | | | | |
|---|---|---|---|---|---|---|---|---|---|
| | | DULLING | | | | DELAMINATION (Test of Adhesiveness) | | | |
| | | Examples | | | Comp. Ex. | Examples | | | Comp. Ex. |
| °C. | sec | 1 | 2 | 3 | 1 | 1 | 2 | 3 | 1 |
| 90 | 30 | none | none | none | none | none | none | none | present |
| 100 | 20 | none | none | none | none | none | none | none | present |

TABLE 2

| | peel resistance (g/5 cm) | residual adhesiveness (%) |
|---|---|---|
| Example 1 | 9.8 | 97 |
| Example 2 | 9.5 | 95 |
| Example 3 | 9.0 | 88 |
| Comparison Example 1 | 9.8 | 97 |

The cured release film forming organopolysiloxane composition of the present invention cures rapidly at relatively low temperatures ($\leq 100°$ C.) to form a cured film that tightly adheres to many different types of substrates (such as synthetic films, paper, polyethylene-laminated paper, and others) and that exhibits an excellent release performance with respect to tacky or sticky substances.

What is claimed is:

1. A cured release film forming organopolysiloxane composition obtained by curing the following composition comprising (A) an organopolysiloxane with an average unit formula $$R_b SiO_{(4-b)/2}$$

that contains in each molecule at least 2 alkenyl groups with the general formula $$H_2C=CH-(CH_2)_n-$$

where in n has a value of 2 to 8;

(B) 1 to 200 weight parts per 100 weight parts of (A) of an organohydrogenpolysiloxane that contains in each molecule at least 2 silicon-bonded hydrogen atoms and at least 1 alkenyl group with the general formula $$H_2C=CH-(CH_2)_n-$$

wherein n has a value of 2 to 8, (C) an addition-reaction inhibitor, and (D) a platinum group metal catalyst wherein R is selected from a substituted or unsubstituted monovalent hydrocarbon group, b has a value of 1.9 to 20.5.

2. A cured release film forming organopolysiloxane composition as claimed in claim 1 wherein in component (A) the alkenyl group is a hexenyl group.

3. A cured release film forming organopolysiloxane composition as claimed in claim 1 wherein in component (B) the alkenyl group is a hexenyl group.

4. A cured release film forming organopolysiloxane composition as claimed in claim 1 wherein the platinum group metal catalyst is a chloroplatinic acid/divinyltetramethyldisiloxane complex.

5. A cured release film forming organopolysiloxane composition as claimed in claim 1 wherein the addition-reaction inhibitor is 3,5-dimethyl-1-hexyn-3-ol.

6. A cured release film forming organopolysiloxane composition as claimed in claim 1 wherein the alkenyl organopolysiloxane (A) is a silanol-endblocked hexenylmethylsiloxane-dimethylsiloxane copolymer.

7. A cured release film forming organopolysiloxane composition as claimed in claim 1 wherein the organohydrogenpolysiloxane (B) is a dimethylsiloxane-hexenylmethylsiloxane-hydrogenmethylsiloxane copolymer.

8. A cured release film forming organopolysiloxane composition as claimed in claim 1 which additionally comprises (E) a nonreactive organopolysiloxane that contains neither silicon-bonded alkenyl nor silicon-bonded hydrogen.

9. A cured release film forming organopolysiloxane composition as claimed in claim 8 wherein the nonreactive organopolysiloxane (E) is present at a quantity up to 200 weight parts per 100 parts of (A).

10. A cured release film forming organopolysiloxane composition as claimed in claim 8 wherein the nonreactive organopolysiloxane (E) is a trimethylsiloxy-endblocked dimethylpolysiloxane gum.

* * * * *